(12) United States Patent
Kew et al.

(10) Patent No.: US 12,325,121 B2
(45) Date of Patent: Jun. 10, 2025

(54) ROBOT APPENDAGE ACTUATION

(71) Applicant: GOOGLE LLC, Mountain View, CA (US)

(72) Inventors: J. Chase Kew, San Francisco, CA (US); James Lubin, Oakland, CA (US); Ken Caluwaerts, Los Angeles, CA (US); Stefano Saliceti, London (GB); Brandon Kinman, Santa Cruz, CA (US); Byron David, San Jose, CA (US); Claudio Fantacci, London (GB)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/288,927

(22) PCT Filed: Jul. 12, 2021

(86) PCT No.: PCT/US2021/041288
§ 371 (c)(1),
(2) Date: Oct. 30, 2023

(87) PCT Pub. No.: WO2023/287393
PCT Pub. Date: Jan. 19, 2023

(65) Prior Publication Data
US 2024/0198541 A1  Jun. 20, 2024

(51) Int. Cl.
*B25J 17/00* (2006.01)
*B25J 17/02* (2006.01)
*B25J 19/00* (2006.01)

(52) U.S. Cl.
CPC ........... *B25J 17/02* (2013.01); *B25J 19/0025* (2013.01)

(58) Field of Classification Search
CPC ........ B25J 19/0025; B25J 9/123; B25J 9/144; B25J 17/0258; B25J 17/0266
See application file for complete search history.

(56) References Cited

U.S. PATENT DOCUMENTS 4,300,362 A * 11/1981 Lande ................. B25J 17/0266
464/147
4,919,382 A * 4/1990 Forman ................ F16M 11/125
248/487

(Continued)

FOREIGN PATENT DOCUMENTS

| CN | 111065495 | 4/2020 |
| CN | 112873266 | 6/2021 |

(Continued)

OTHER PUBLICATIONS

European Patent Office; International Search Report and Written Opinion issued in Application No. PCT/US2021/041288; 8 pages; dated May 6, 2022.

(Continued)

*Primary Examiner* — Gregory Robert Weber
(74) *Attorney, Agent, or Firm* — Gray Ice Higdon

(57) ABSTRACT

In various implementations a removable appendage of a robot can allow for stable pitch and yaw, while mitigating interference with other movements of the robot. A neck of the robot can include at least two linear actuators, each coupled to a rod that is driven to move linearly from the linear actuators. An appendage of the robot can be coupled to the neck. The appendage can include a at least two tracks, where each track receives an end of the rods to slidably engage the rod.

20 Claims, 8 Drawing Sheets

(56) References Cited

U.S. PATENT DOCUMENTS

| | | | |
|---|---|---|---|
| 5,740,699 A * | 4/1998 | Ballantyne | B25J 9/0069 |
| | | | 403/120 |
| 6,860,169 B2 * | 3/2005 | Shinozaki | B25J 17/0266 |
| | | | 901/29 |
| 9,561,595 B1 * | 2/2017 | Dellon | F16H 25/186 |
| 2011/0196509 A1 | 8/2011 | Jansen et al. | |
| 2018/0073614 A1 | 3/2018 | Claffee et al. | |
| 2019/0168400 A1 | 6/2019 | Kamon | |
| 2020/0298412 A1 | 9/2020 | Funazukuri | |

FOREIGN PATENT DOCUMENTS

| | | |
|---|---|---|
| JP | 2004042151 | 2/2004 |
| JP | 2011218485 | 11/2011 |
| JP | 2013091145 | 5/2013 |
| JP | 2020151012 | 9/2020 |
| WO | 2018074101 | 4/2018 |

OTHER PUBLICATIONS

Japanese Patent Office; Notice of Reasons for Rejection issued in Application No. 2022-566217; 7 pages; dated Oct. 10, 2023.
The Korean Intellectual Property Office; Notice of Office Action issued in Application No. 10-2022-7039765; 14 pages; dated Sep. 26, 2024.
European Patent Office, Intention to Grant issued in Application No. 21749950.8; 37 pages; dated Oct. 30, 2024.
China National Intellectual Property Administration; Notification of First Office Action issued in Application No. 202180034030.2; 17 pages; dated Jan. 15, 2025.

* cited by examiner

ROBOT APPENDAGE ACTUATION

BACKGROUND

Gimbals have been utilized in robots to actuate pitch and yaw of appendages, such as cameras, heads, and the like. However, gimbal motors can be heavy. For example, gimbals can frequently weigh more than 40 grams, which may not be desirable for smaller or lighter robot designs. Gimbals can also require placement directly at the location of movement (e.g. at the pivot point of the head, camera, etc.), which can place the entire mass of the heavy gimbal on the longest lever of a robot. This can result in the robot being unbalanced and susceptible to toppling. Further, gimbals can require a large amount of empty space within a robot housing or shell in order to have ample room to actuate multiple axes. Accommodating such a large amount of empty space can require significant materials for the robot housing and/or can prevent utilization of a gimbal within the constraints of a smaller robot design.

SUMMARY

Implementations described herein are directed to apparatus and methods for articulating an appendage (e.g., a removable appendage) of a robot to allow for stable pitch and yaw of the appendage, while mitigating interference with other movements of the robot. For example, implementations described herein can enable actuation of an appendage without requiring the actuators to be located directly at the location of movement, which can result in better stabilization of the robot (e.g., by enabling the actuators to be located closer to the center of mass of the robot). As another example, implementations described herein provide a lightweight and/or compact design for actuation of the appendage, which can result in better stabilization of the robot and/or enable integration into smaller and/or lighter weight robots. For instance, implementations can provide some, or all, of the freedom of movement of the appendage that would be afforded if the appendage were controlled by a gimbal—but can do so with component(s) that are collectively lighter than a gimbal, collectively occupy less space than a gimbal, and/or that can be positioned to mitigate any adverse impact on a center of mass of the robot (thereby promoting stability of the robot).

Some implementations can, when a vision component (e.g., camera) is disposed on the appendage or incorporated as part of the appendage, provide for an increase in effective field of view (e.g., relative to a non-actuable appendage or single-axis actuable appendage) through controlled actuation of the appendage. For example, actuation of the appendage according to implementations disclosed herein can allow corresponding dynamic adjustment of the current field of view of the vision component, thereby increasing the effective field of view and enabling the robot to process images that collectively capture a large area of an environment of the robot, and to act upon such processing. For instance, the increased effective field of view can allow a robot to selectively actuate the appendage such that area(s) at or near feet or wheels of the robot are selectively within the current field of view, area(s) above the robot are selectively in the field of view, etc.

Some implementations can additionally or alternatively enable the robot to selectively actuate its appendage to provide corresponding visual feedback to human user(s) that are in an environment with the robot, thereby enabling effective human-robot interaction. For example, a robot can signal, to nearby human user(s), an intent of the robot to move in a particular direction by providing control command(s) to actuators that cause the appendage to turn in the particular direction. As another example, a robot can signal, to nearby human user(s), that the robot has recognized presence or the human user(s) and/or understood a command dictated by the human user(s), by providing control command(s) to actuators that case the appendage to nod or shake.

Apparatus described herein for actuating movement of an appendage (e.g., a head, tail, or other appendage) can include at least two linear actuators disposed in a neck of the robot (e.g., a neck that extends from a main body of the robot). Each of the linear actuators can be coupled to a rod, which connects the linear actuator at a first end of the rod to an appendage at a second end of the rod. Put another way, each rod can be coupled to a corresponding linear actuator at a first end of the rod and coupled to the appendage at an opposed second end of the rod. One or both of the ends of each of the rods can, in some instances, be hemispherical ends, although the ends of rods are not so limited (i.e., non-hemispherical end(s) could instead be provided on a rod, such as pyramid shaped ends). The appendage can include tracks that receive and slidaby engage the second end of each of the rods. The tracks can each be, for example a channel, such as a "V" or "U" shape channel, in which the second end of the rod can sit. In some implementations, the second end of the rod can be constructed in such a way as to be trapped by the track. For example, the second end can have a larger diameter than the body of the rod. Such a configuration can allow the rods to maintain contact with the tracks as the orientation of the appendage changes. Simultaneously moving both of the two rods inward (relative to the neck) or both of the rods outward (relative to the neck) actuates tilt of the appendage; while moving one of the rods inward (relative to the neck) and the other rod outward (relative to the neck) at a substantially equal rate actuates yaw. Where the rate of movement of one rod inward and one rod outward is not equal, both pitch and yaw are actuated. In such implementations, the degree of pitch corresponds to the degree to which the movement is non-equal. Further, where only one of the rods is moved (inward or outward), while the other rod remains stationary, both yaw and tilt of the appendage are actuated. Movement of the rods is driven by the linear actuators.

In some implementations, one or more levers can be used to connect the linear actuators to the rods. In many implementations, the neck of the robot may be small and accordingly have space constraints, and use of a lever can allow for the linear actuators to be placed out of alignment with the rods to utilize less space in the neck and/or enable the neck to be shorter (i.e., the appendage to be close to the main robot body). A flexure can, in some implementations, further connect the levers to the rods. The flexure can allow for an additional range (e.g., about 2 millimeters or other range) of flex up or down as the lever rotates. The specific range of flex provided by virtue of the flexure can vary based on the geometry and/or dimension of the flexure. In various implementations, the flexure component itself can contain a thin, flexible, horizontal bar with two stiff pongs (one disposed above the bar and one disposed below the bar). When the thin, flexible horizontal bar of the flexure has flexed to its maximum, these stiff prongs can engage the bar to prevent it from flexing further and snapping.

In some implementations, the neck can further include a fixed rod. Similar to the other rods described herein, this fixed rod may also have an end that can sit in a third angled track of the appendage. Unlike the other rods, the fixed rod is not coupled with a linear actuator, but rather is fixed or anchored to the neck (e.g. through a screw or the like). While fixed or anchored to the neck, the fixed rod will be slidably engaged with the third angled track. In other implementations, the neck can further include a third linear actuator and a third rod. In such implementations, the third linear actuator can drive linear movement of the third rod, similar to the other rods described. Having the third linear actuator can increase the range of movement of the appendage and/or increase the granularity of control of the appendage.

The appendage can be coupled with the neck, for example with one or more spring(s), rubber band(s), and/or other biasing coupling component(s). When coupled with spring(s), the spring(s) can each connect at one end to the appendage and at the other end at the neck. In some implementations, the spring(s) can be uncoupled to allow the appendage to detach from the neck. Coupling the appendage via spring(s) may, for example, allow for a more sturdy and/or robust robot assembly. As an example, if the appendage of the robot were to make contact with something in the environment, the spring(s) can prevent the appendage from falling to the ground and/or allow it to flex from the neck without snapping or breaking.

The appendage can additionally, in some implementations, include an electrical connection that couples with a corresponding electrical connection in the robot in order to power various electronics contained within the appendage. For example, the appendage can include a vision component and/or other sensor(s) to facilitate control of the robot. A robot control system can receive various signals from the vision component(s) and/or sensor(s) of the appendage to make determinations regarding target positioning of the appendage and/or determinations regarding target paths and/or trajectories of other component(s) of the robot. For example, vision data from vision component(s) of the appendage can be processed by the control system to determine a navigational path of the robot and/or to determine a path of a robot arm of other component of the robot. In some implementations, it can be desirable to move the appendage into a certain position, based on one or more of the signals received by the control system and/or based on one or more determinations made by the control system. Control of the linear actuators can effectuate movement of the rods to achieve this certain position. For example, in some implementations, the robot control system may separately allow for gaze control and pitch-yaw control of the appendage. With gaze control, the robot control system and/or a user may specify a point in three-dimensional space; the robot control system can then translate that point in three-dimensional space into one or more positions of the rods and/or linear actuators in order to allow appendage to move to the specified point in space. As an example, a robot control system, before navigating the robot (e.g., via wheel(s) and/or feet thereof), can cause the appendage to be directed toward wheel(s) and/or feet of the robot to enable vision data to be captured (by vision component(s) of the appendage) that captures the area near the wheel(s) and/or feet, and the vision data processed to ensure no obstructions are present. As another example, a robot control system, before navigating toward a location and/or moving a robot arm toward a location, cause the appendage to be directed toward the location to enable vision data to be captured (by vision component(s) of the appendage) that captures the location, and the vision data processed to determine pose(s) and/or other characteristic(s) of any object(s) that may be present in the location. As another example, this may allow a user to specify a location where the head of the robot is to be positioned, and the control system can then drive the linear actuator and rods so that the robot may turn its head toward that point. With pitch-yaw control, a user may specify a desired pitch and/or yaw of the appendage. The robot control system can then translate that specified pitch and/or yaw into one or more positions of the rods and linear actuators so that the appendage may move to the specified orientation.

The preceding is provided as an overview of only some implementations. Those and other implementations are described in more detail herein.

Other implementations can include a non-transitory computer readable storage medium storing instructions executable by a processor to perform a method such as one or more of the methods described above. Yet another implementation can include a robot that includes one or more processors that execute stored instructions (e.g., stored in memory of the robot) perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

FIGS. 1, 1A, and 2-3 illustrate exemplary robot components 100 with which selected aspects of the present disclosure can be practiced in accordance with various implementations. The robot components described herein can be incorporated into robots 10 of various forms, including but not limited to a telepresence robot, a robot arm, a humanoid robot, an animal robot (e.g., a quadruped robot), an insect robot, an aquatic robot, a wheeled robot, a submersible robot, an unmanned aerial vehicle ("UAV"), and so forth. Additionally, these robot forms include biped robots, quadruped robots, hexapod robots, and so on.

Figure 1:
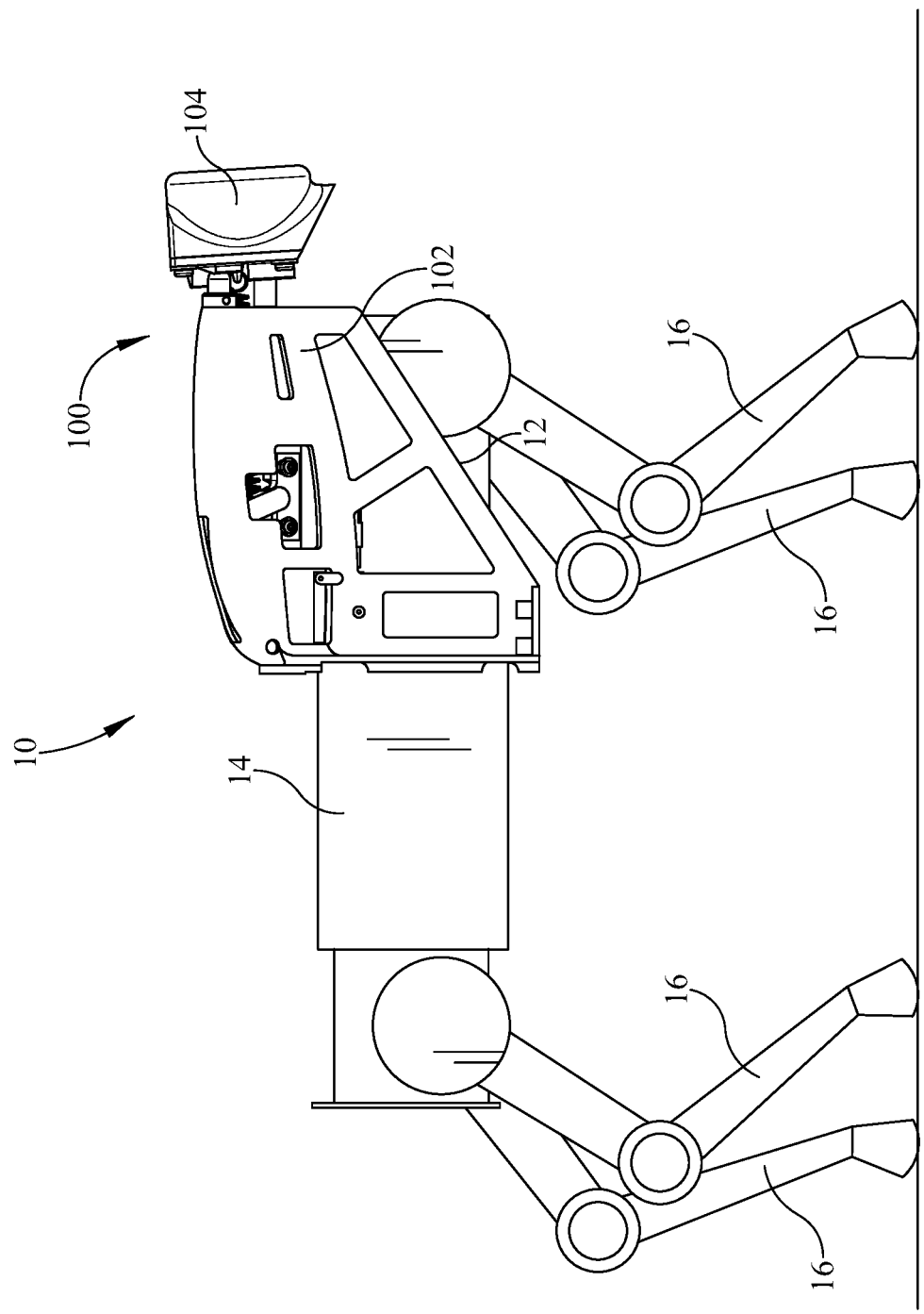
FIG. 1 depicts a side view of a robot, including an appendage, neck, and body, in accordance with various implementations described herein.
Figure 1A:
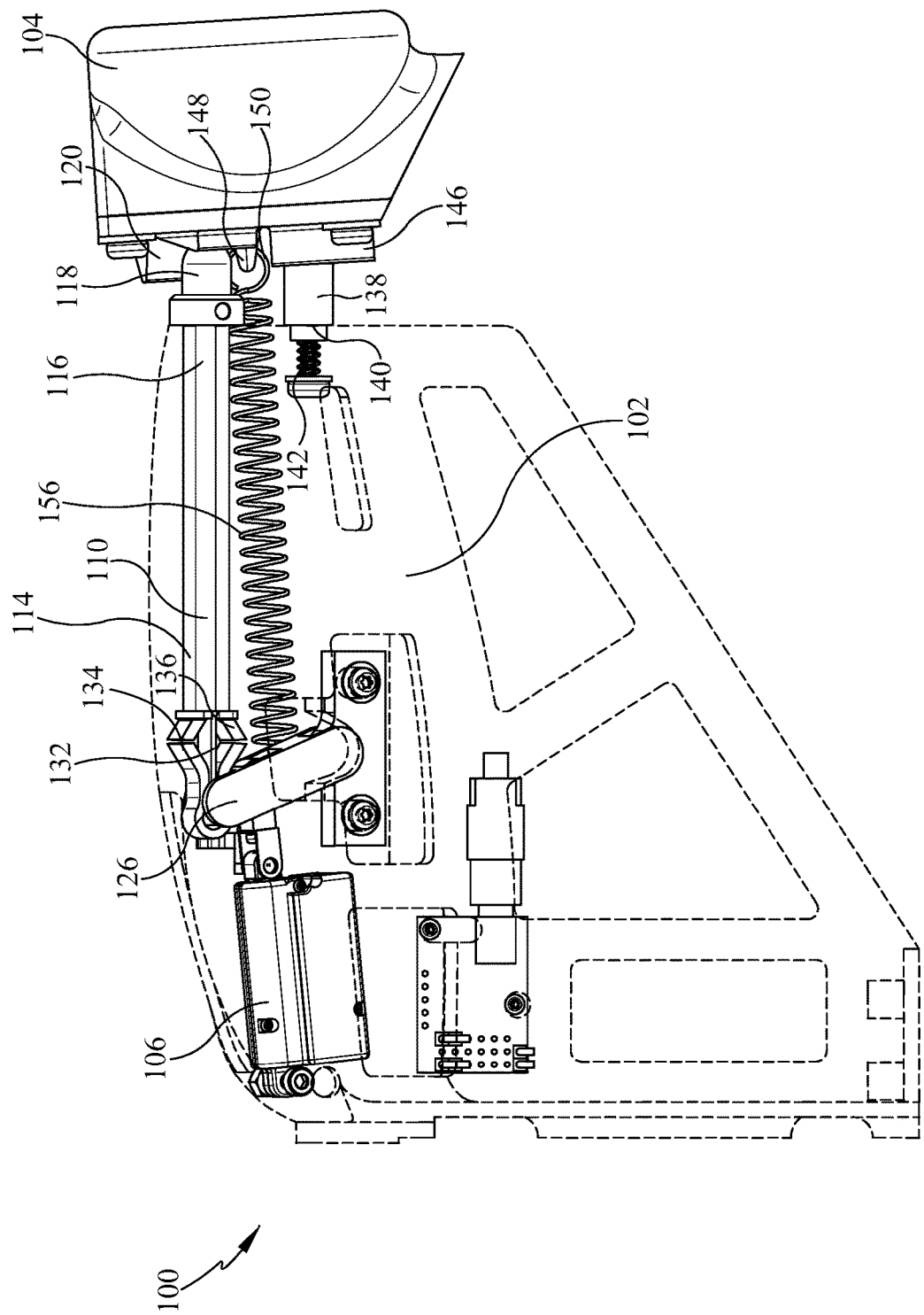
FIG. 1A depicts a side view of a robot component with an appendage in a first position, in accordance with various implementations described herein.

In the example depicted in FIG. 1, the robot 10 includes the robot components 100, which collectively includes a neck 102 and an appendage 104 (e.g., a head, tail, or the like). The neck 102 can, in most implementations, include a housing 12 (see in particular FIG. 1) that is represented by the dashed lines in FIGS. 1A-3. This housing may be constructed of any suitable material and may be designed to protect the internal components of the neck 102 (described herein) from the elements, impacts, and so on. Furthermore, the shape and dimensions of the neck 102 may, in some implementations, be defined by the housing. The robot, in some implementations, can further include other components, including, but not limited to, a body 14, legs 16, arm appendages, etc.

Figure 2:
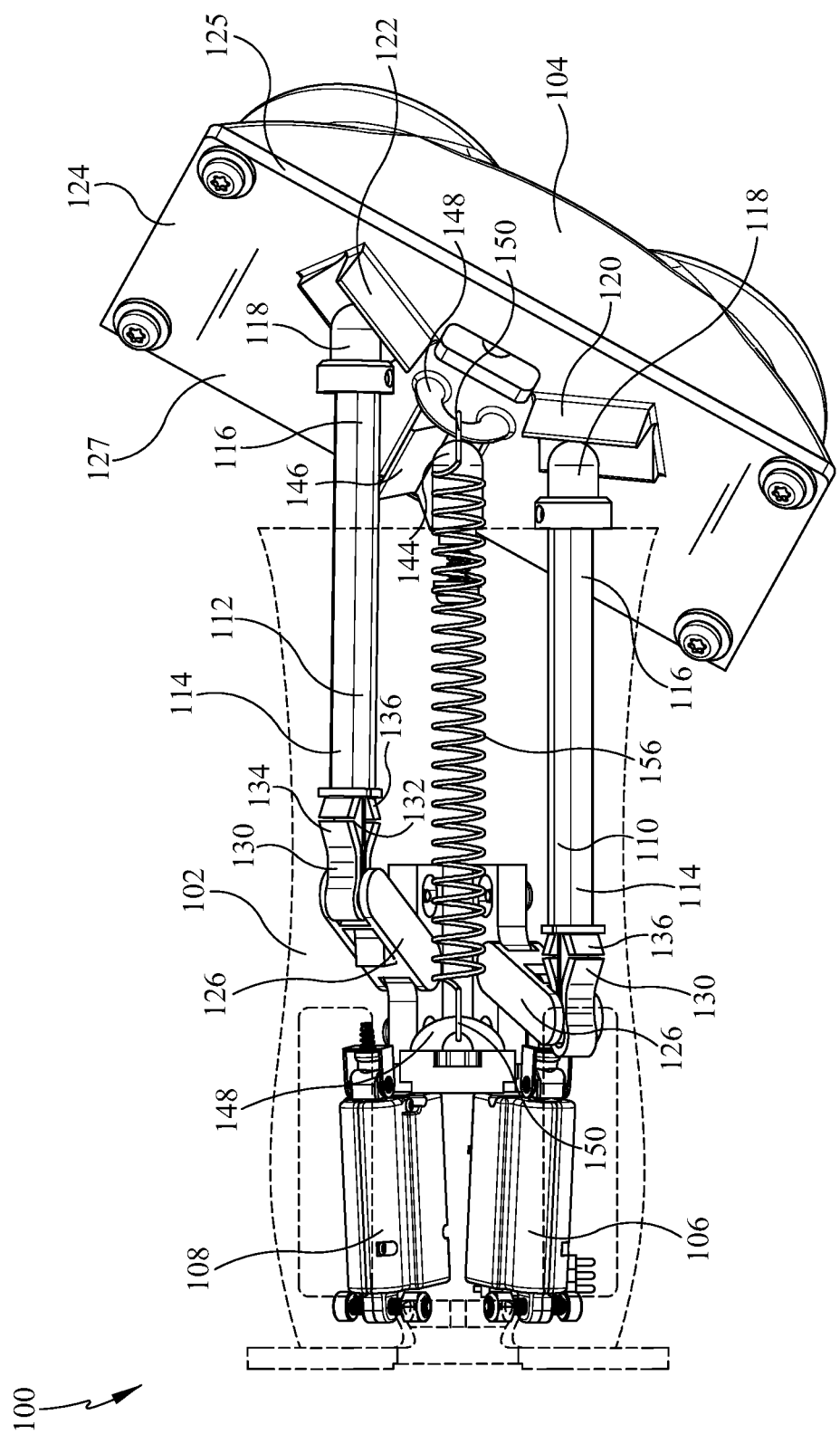
FIG. 2 depicts a top view of the robot component of FIG. 1 with the appendage in a second position, in accordance with various implementations described herein.
Figure 3:
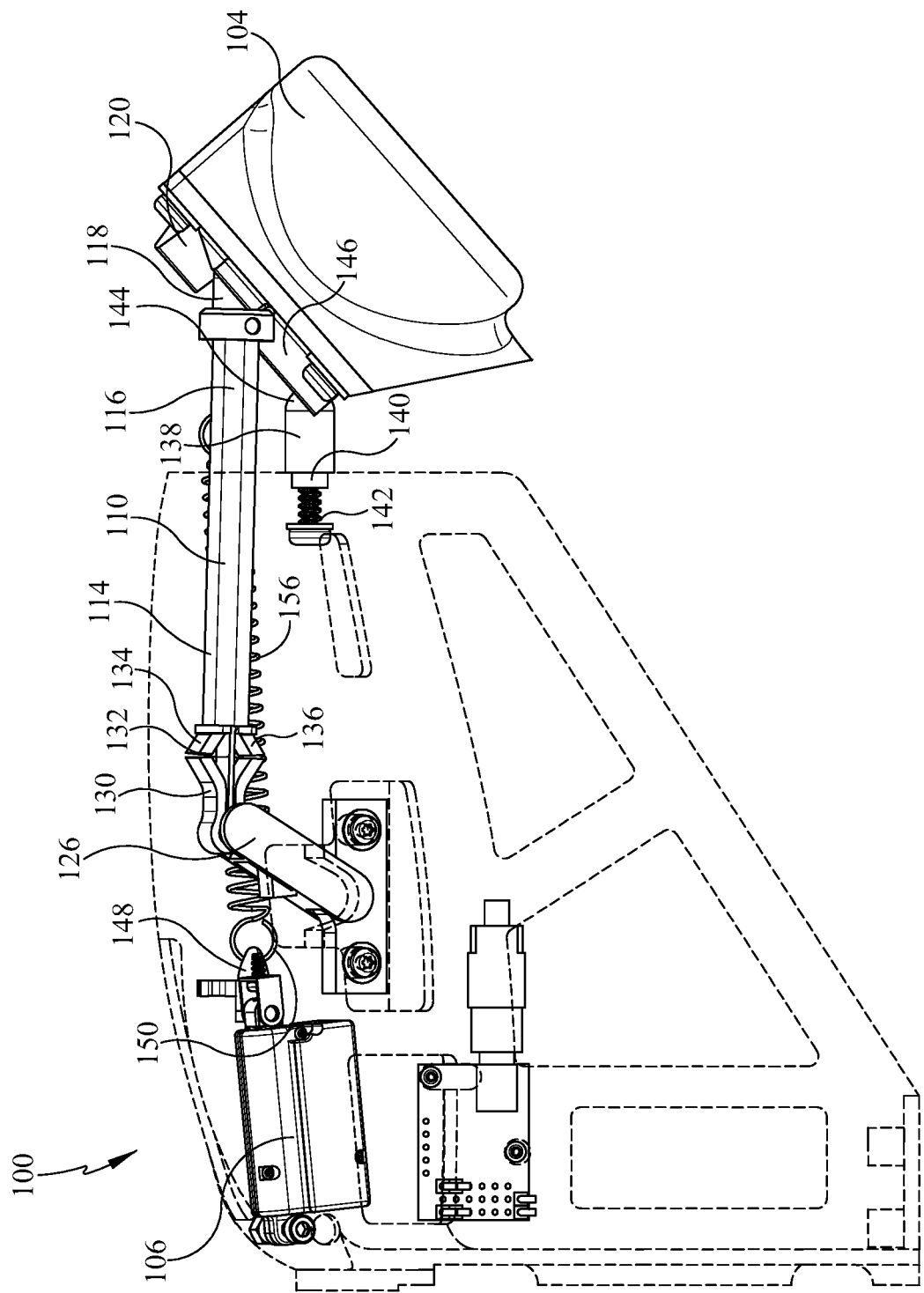
FIG. 3 depicts a side view of the robot component of FIG. 1 with the appendage in a third position, in accordance with various implementations described herein.

Movement of the appendage 104 of the robot is actuated by at least a first and second linear actuator 106, 108 that are disposed within the neck 102. Each of the first and second linear actuators 106, 108 are coupled to a first or second rod 110, 112, respectively. These rods 110, 112 connect to the linear actuators 106, 108 at a first end 114 and to the appendage at a second end 116. The linear actuators 106, 108 are individually controllable to drive linear movement of the rods 110, 112 in order to dynamically adjust the pose of the appendage 104 relative to the neck 102. For example, where both rods 110, 112 are fully recessed into the neck 102, such as illustrated in FIG. 1, the appendage 104 is in a neutral position. In some implementations, simultaneously moving both of the rods 110, 112 inward (relative to the neck) at the same rate or both of the rods outward (relative to the neck) at the same rate, such as illustrated in FIG. 3, actuates tilt of the appendage 104. In some of those implementations, moving one of the rods 110 inward (relative to the neck) at the same rate and the other rod 112 outward (relative to the neck) at the same rate, such as illustrated in FIG. 2, actuates yaw. Where the rate of movement of one rod 110 inward and one rod 112 outward is not equal, both pitch and yaw are actuated. In such implementations, the rate of yaw can be dependent on difference (e.g. delta) of the rate of movement between the two, as well as the direction of movement of the two rods 110, 112. Further, where only one of the rods 110 is moved (inward or outward) and the other rod 112 remains stationary, both yaw and tilt of the appendage are actuated. The rods 110, 112 can each optionally further include a hard stop, which can prevent the coupled linear actuator 106, 108 from traveling outside of the intended range of motion. Such a hard stop may, in some implementations, be in the form of a raised ridge, around the rod 110, 112, and can interact with a corresponding portion of the linear actuator to restrict the range.

The appendage 104 can include a first and second track 120, 122 that receive and slidably engage the second end 116 of each of the rods 110, 112. The rods 110, 112 can, in some implementations, have hemispherical ends 118, although the rods are not so limited. For example, in some other implementations the rods 110, 112 can instead each have at least one non-hemispherical end (e.g., at least the end that engages with the track), such as a blunt or generally cube-shaped end, pyramid shaped end, a chamfered end, or other non-hemispherical end. The tracks 120, 122 can be angled in order to receive, and optionally to hold, the second end 116 of the rods 110, 112 in place. In some implementations, can each be, for example, a channel, such as a "V" or "U" shape, in which a second end 118 of the rod 110, 112 can sit. The configuration of a channel as the track 120, 122 and a hemispherical end 118 of the rod 110, 112 may allow the rods to maintain contact with the tracks as the appendage 104 is moved and the orientation of the appendage changes. The angle at which the hemispherical end 118 contacts the track 120, 122 can vary as the rod 110, 112 moves linearly and the rod 110, 112 can slidably move within the track as the rod 110, 112 moves linearly. As a non-limiting example, the angled track 120, 122 can keep the hemispherical end 118 seated within the track 120, 122 when the rods 110, 112 are fully extended (e.g. the appendage is tilted downward). In some implementations, the second end 118 of the rod(s) 110, 112 can be trapped by or locked into the track 120, 122. For example, second end can have a larger diameter, or be wider, than the body of rod. In such an implementation, the rod(s) 110, 112 may, for example, have a "T"-shaped configuration, such that the second end of the rod(s) 110, 112 is the top, wider, portion of the "T". In such an implementation, the rod(s) 110, 112 remain removable through one or both ends of track 120, 122.

As the linear actuator(s) 106, 108 drives movement of the rod(s) 110, 112 the rods may slide in the tracks 120, 122 to facilitate movement of the appendage 104. In some implementations, such as illustrated in FIGS. 1-3, the tracks 120, 122 may be planar on a rear surface 124 of the appendage 104. In other implementation the tracks 120, 122 can be disposed on separate planes. The positioning of the tracks 120, 122 on the appendage 104 can vary. In some implementations, such as illustrated in FIGS. 103, the tracks 120, 122 can be disposed at a non-perpendicular angle relative to a top edge 125 of the appendage 104 and/or at a non-parallel angle relative to one another. In some of those implementations, the tracks 120, 122 can be disposed at a 70 to 100 degree angle relative to one another (i.e., in the common plane), such as an 85 to 95 degree angle relative to one another. The particular angles and positioning of the tracks 120, 122 can be dependent on a desired range of motion of the appendage 104. In further implementations, as also illustrated in FIGS. 1-3, the tracks 120, 122 can be disposed on the rear surface 124 of the appendage 104 such that they are mirror images of each other. The locations of the tracks 120, 122 are exemplary and not to be understood as limiting, as the positioning of the tracks 120, 122 on the appendage 104 may vary depending on the geometry and desired range of motion of the appendage 104. The maximum range of motion for the appendage 104 can, in some implementations, be approximately (e.g., +/−10 degrees) 180 degrees in a pitch and/or yaw direction. However, the achieved range of motion for the appendage 104 may vary based on the length of the tracks 120, 122, the length of the stroke of the linear actuator 106, 108, and/or the length of the rods 110, 112. In some implementations, lengthening the stroke of the linear actuator 106, 108, increasing the length of the track(s) 120, 122, and/or increasing the length of the rod(s) 110, 112 can increase the range of motion achieved by the appendage 104.

In some implementations, one or more levers 126 can be used to connect the linear actuators 106, 108 to the rods 110, 112. As mentioned previously, in many implementations, the neck 102 of the robot can have space constraints. The use of a lever(s) 126 can allow for the linear actuators 106, 108 to be placed out of alignment with the rods 110, 112 (as illustrated in FIGS. 1-3). Placement of the rods 110, 112 and linear actuators 106, 108 out of alignment utilizes less space in the neck and/or enables the neck to be shorter (i.e., the appendage to be close to the main robot body). The lever(s) 126 move the rod(s) 110, 112 and can amplify the displacement actuated by the of the linear actuators 106, 108. In such implementations, the first end 114 of the rod(s) 110, 112 couples with the lever(s) 126, and the lever(s) 126 then couple with the linear actuator(s) 106, 108. This configuration allows the linear actuator(s) 106, 108 to drive rotation of the lever(s) 126 (see arrow in FIG. 1), which drives the linear movement (e.g. the extension or retraction) of the rod(s) 110, 112.

In some implementations, a flexure 130 can further connect the lever(s) 126 to the rod(s) 110, 112. This flexure 130 can allow for additional movement or "flex" as the lever 126 rotates up or down. As a non-limiting example, in some implementations, the flexure 130 connecting the lever(s) 126 to the rod(s) 110, 112 allows for an additional 2 millimeters of flex up or down. However, this is not to be understood as limiting, as the amount or degree of additional movement may vary based on the dimension of the flexure 130 and/or lever 126. The flexure 130 can, in some implementations include a thin, flexible, horizontal bar 132 with first stiff pong 134 disposed above the bar 132 and a second stiff prong 136 disposed below the bar 132. When the thin, flexible horizontal bar 132 of the flexure 130 has flexed to its maximum, the stiff prongs 134, 136 engage the bar 132 to prevent it from flexing further and snapping. The stiff prongs 134, 136 can be strong enough so that when they are engaged, may allow for force to be transferred back to the linear actuators 106, 108, which are backdriven. The geometry of the flexure 130 may vary; in particular the length of the thin, flexible, horizontal bar 132 can depend of the length and/or rotational distance of the lever 126. In addition to providing additional flex, the flexure 130 can also, in some implementations, minimize vibration within the neck 102. In some implementations, a linkage or the like can be used as an alternative to a flexure 130.

In some implementations, the neck 102 may additionally include a third rod that may provide additional stability to the appendage 104 and further define the range of motion (e.g. for tilting) of the appendage 104. In some instances, such as illustrated in FIGS. 1-3 the third rod may be a fixed rod 138; while in other instances, the third rod may be a movable rod 438 coupled to a third linear actuator 442, as discussed with reference to FIG. 4. Where the third rod is a fixed rod 138, a first end 140 of the fixed rod 138 may be fixed or anchored to the neck 102, for example through use of a screw 142, anchor, or the like. The fixed rod 138, similar to rods 110, 112 may have a hemispherical second end 144. The hemispherical second end 144 contacts the corresponding third track 146 on the appendage 104. Similar to the first and second tracks 120, 122, the third track 146 is angled in order to receive, and optionally to hold, the second end 144 of the third fixed rod 138. As with the first and second tracks 120, 122 the angle of the third track 146 can be a "V" or "U" shape, in which a hemispherical end 144 of the fixed rod 138 sits. In some implementations all tracks 120, 122, 138 can have the same shape, angle, and/or length. However, in other implementations, the tracks 120, 122, 138 may vary in shape, angle, and/or length. In some implementations, such as illustrated in FIGS. 1-3, the third track 138 can be disposed along a substantially central axis dividing the appendage in half, for example running from the top edge 125 of the appendage 104 to a bottom edge 127. Put another way, in those implementations the third track 138 can be approximately perpendicular to the top edge 125, such as at an 85 to 90 degree angle relative to the top edge. In some of those implementations, the third track 138 can be at an approximately 35 to 55 degree angle (e.g., approximately 45 degree angle) relative to the tracks 120 and 122. Similar to tracks 120, 122, the location of the third track 146 is exemplary and not to be understood as limiting, as it may vary depending on the geometry and desired range of motion of the appendage 104.

The appendage 104 can be coupled with the neck 102. In some implementations the coupling of the appendage 104 with the neck 102 is a removable coupling. In some of those implementations, the removable coupling can be via a spring 156 (as illustrated in FIGS. 1-3), rubber band, and/or other coupling structure that causes the appendage 104 and the neck 102 to be forced toward engagement with one another. Where coupled with a spring 156, the spring 156 can connect at one end to the appendage 104 and at the other end at the neck 102. In some implementations, the neck 102 and appendage can each further include a receiver 148, which is illustrated in FIGS. 1-3 as "U" shaped bracket. The spring 156 can further include a hook 150 (open or closed) that connects to the receiver 148 on each of the neck 102 and appendage 104, thereby coupling the appendage 104 and neck 102. In some implementations, the spring 156 can be uncoupled from the hook 150 on either (or both) the appendage 104 or the neck 104 in order to uncouple the appendage 104 and neck 102, which can also, in various implementations, allow for the appendage 104 to be separated from the neck 102. In some of those implementations, such separation may be desirable for exchanging a type of appendage and/or for easier storage and portability. The spring 156 can bias the appendage 104 towards the neck 102, such that the spring 156 pulls the appendage 104 towards a neutral position (see FIG. 1). Additionally, the spring 156 can have an associated spring constant, or stiffness constant K, that is specific to the spring used. A spring with a greater spring constant K can require more force to compress or expand than another spring having a lesser spring constant. The spring constant of spring 156 can change the force required to actuate movement of the appendage 104. Coupling the appendage 104 to the neck 102 via a spring 156 can, for example, allow for a sturdier robot assembly. As a non-limiting example, if the appendage 104 were to make contact with something in the environment (e.g. a table, wall, etc.), the spring 156 can prevent the appendage 104 from falling to the ground from the impact.

Figure 4:
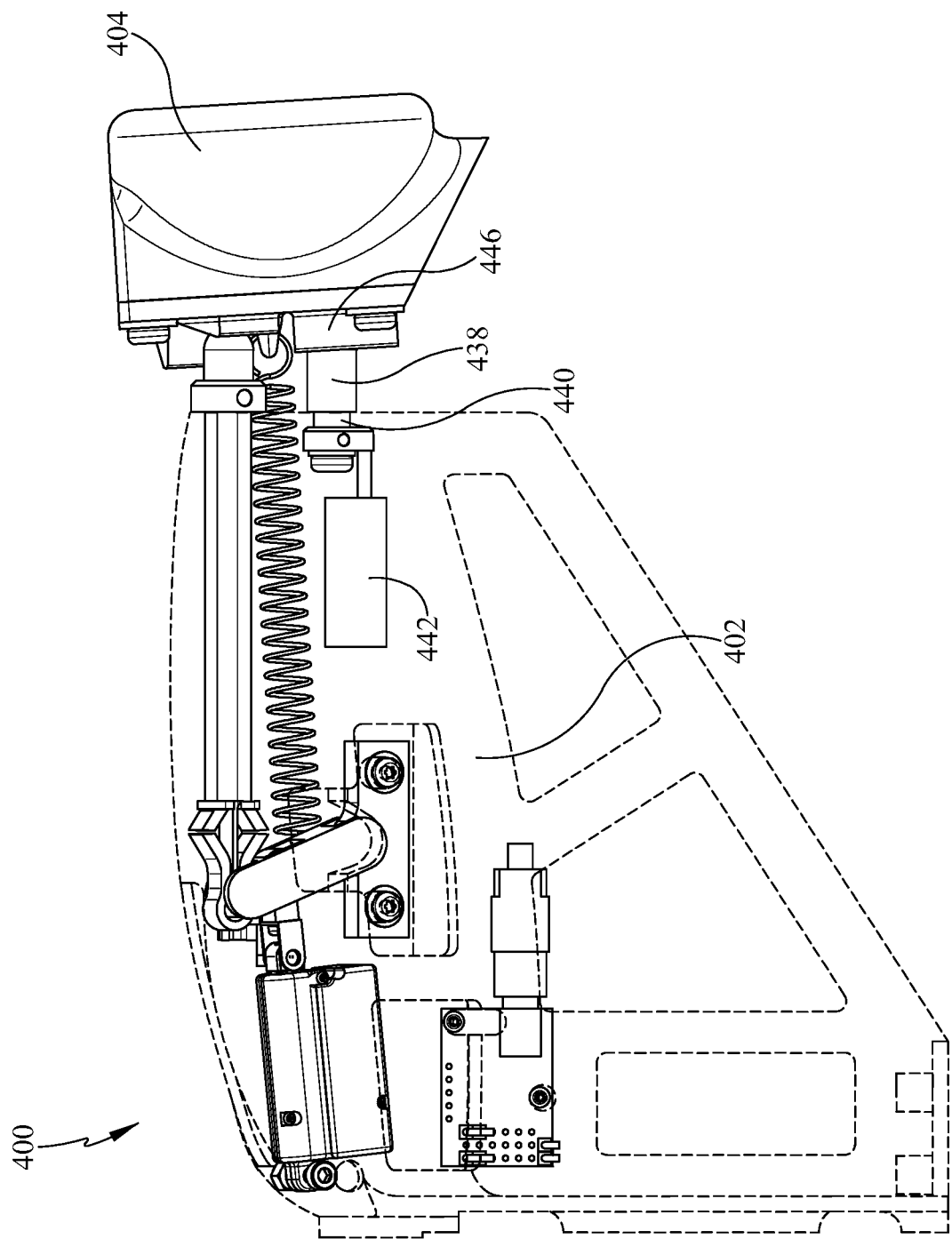
FIG. 4 depicts a side view of a robot component with an appendage in a first position, in accordance with various implementation described herein.

Referring now to FIG. 4, another exemplary robot component 400 with an appendage 404 and neck 402 is illustrated. The implementation illustrated in FIG. 4 is similar to the robot component 100 illustrated in FIGS. 1-3, with the exception that the neck 402 includes a third moveable rod 438 third linear actuator 442. The third, movable rod 438 can be coupled at a first end 440 to the third linear actuator 442 in the neck 402. In some implementations, such as illustrated in FIG. 4, the rod 438 can be directly coupled to the linear actuator 442, without a lever or flexure (as illustrated in and described with to FIGS. 1-3). This is not to be understood as limiting, as in some instances, particularly where space constraints allow, a lever and/or a flexure can be disposed between the linear actuator 442 and the rod 438, and in various implementation can function as described with reference to FIGS. 1-3. The moveable rod 438, similar to rods previously described herein, can have a hemispherical second end (not illustrated) that contacts a corresponding third track 446 on the appendage 404. Similar to the first and second tracks described previously, the third track 446 is also angled in order to receive, and optionally hold, the second end of the movable rod 438. The third track 446 can also be a "V" or "U" shape, into which the hemispherical end of the fixed rod 438 sits.

Figure 5:
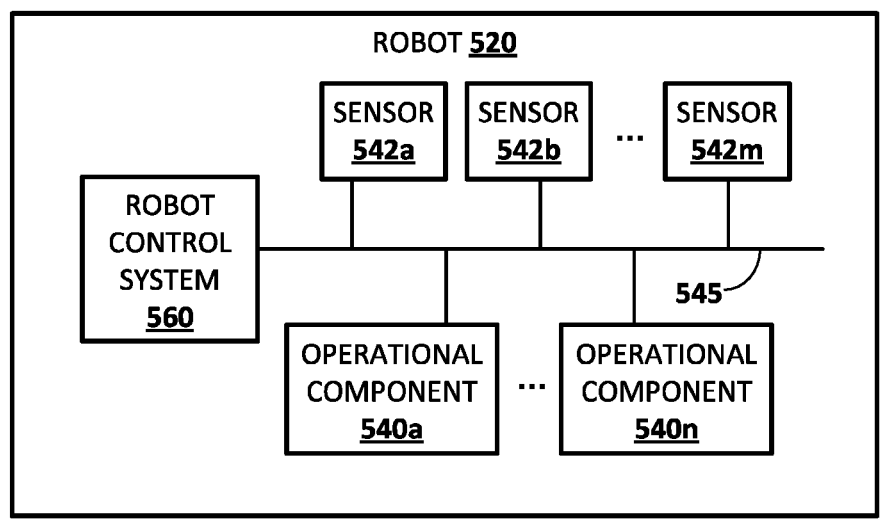
FIG. 5 schematically depicts an example architecture of a robot.

FIG. 5 schematically depicts an example architecture of an exemplary robot 520, which can incorporate the features discussed herein with reference to FIGS. 1-4. The robot 520 includes a robot control system 560, one or more operational components 540a-540a (e.g. a neck, appendage, etc.), and one or more sensors 542a-542m. The sensors 542a-542m can include, for example, vison components (e.g. cameras), vision sensors, light sensors, pressure sensors, pressure wave sensors (e.g., microphones), proximity sensors, accelerometers, gyroscopes, thermometers, barometers, and so forth. While sensors 542a-m are depicted as being integral with robot 520, this is not to be understood as limiting. In some implementations, sensors 542a-m can be located external to robot 520, e.g., as standalone units.

As an example, the one or more of the vision components 542a-542m can include, for example, a monocular camera, a stereographic camera (active or passive), and/or a light detection and ranging (LIDAR) component. A LIDAR component can generate vision data that is a 3D point cloud with each of the points of the 3D point cloud defining a position of a point of a surface in 3D space. A monocular camera may include a single sensor (e.g., a charge-coupled device (CCD)), and generate, based on physical properties sensed by the sensor, images that each includes a plurality of data points defining color values and/or grayscale values. For instance, the monocular camera can generate images that include red, blue, and/or green channels. A stereographic camera can include two or more sensors, each at a different vantage point, and can optionally include a projector (e.g., infrared projector). In some of those implementations, the stereographic camera generates, based on characteristics sensed by the two sensors (e.g., based on captured projection from the projector), images that each includes a plurality of data points defining depth values and color values and/or grayscale values. For example, the stereographic camera may generate images that include a depth channel and red, blue, and/or green channels.

Operational components 540a-540a can include, for example, a neck, appendage and/or all associated components such as the linear actuators, as described herein with reference to FIGS. 1-4. In other examples, operational components 540a-540a can include one or more end effectors and/or one or more servo motors or other actuators to effectuate movement of one or more components of the robot. As used herein, the term actuator encompasses a mechanical or electrical device that creates motion (e.g., a motor), in addition to any driver(s) that can be associated with the actuator and that translate received control commands into one or more signals for driving the actuator. Accordingly, providing a control command to an actuator can comprise providing the control command to a driver that translates the control command into appropriate signals for driving an electrical or mechanical device to create desired motion. With the linear actuator implementation described herein, linear movement of the rods is driven. However, in other implementations, other actuator(s) can be provided for driving movement of other robot components, for example, robot wheels, legs, or the like. Such other actuator(s) can include linear actuator(s) and/or other actuator(s) (e.g., servo motor(s)).

As a non-limiting example, the robot control system 560 can receive various signals from the one or more sensors 542a-542m to make determinations regarding target positioning of an appendage (e.g. appendage 104 of FIGS. 1-3 or appendage 404 of FIG. 4). In some implementations, it may be desirable to move the appendage into a certain position, based on the signals received by the control system 560. For example, where the appendage is a head, it may be desirable in some instances for the head to move towards a stimulus (e.g. a particular noise). Control of the linear actuators can effectuate movement of the rods to achieve this target position.

The robot control system 560 can be implemented in one or more processors, such as a CPU, GPU, and/or other controller(s) of the robot 520. In some implementations, the robot 520 can comprise a "brain box" that can include all or aspects of the control system 560. For example, the brain box can provide real time bursts of data to the operational components 540a-n, with each of the real time bursts comprising a set of one or more control commands that dictate, inter alia, the parameters of motion (if any) for each of one or more of the operational components 540a-n, such as the linear actuators of the neck. In some implementations, the robot control system 560 can be used to implement actions described herein.

As one non-limiting example, the robot control system and/or a user may specify a point in three-dimensional space and the robot control system 560 can then translate that point in three-dimensional space into one or more positions of the rods (e.g. 110, 112 of FIGS. 1-3) and/or linear actuators (e.g. 106, 108 of FIGS. 1-3) in order to allow an appendage to move to the specified point in space. As an example, a robot control system 560, before navigating the robot (e.g., via wheel(s) and/or feet thereof), can cause the appendage to be directed toward wheel(s) and/or feet of the robot to enable vision data to be captured (by vision component(s) of the appendage) that captures the area near the wheel(s) and/or feet, and the vision data processed to ensure no obstructions are present. As another example, a robot control system 560, before navigating toward a location and/or moving a robot arm toward a location, cause the appendage to be directed toward the location to enable vision data to be captured (by vision component(s) of the appendage) that captures the location, and the vision data processed to determine pose(s) and/or other characteristic(s) of any object(s) that may be present in the location. As another example, a user may specify a location where the appendage of the robot is to be positioned, and the control system 560 can then drive the linear actuator (e.g. 106, 108 of FIGS. 1-3) and rods (e.g. 110, 112 of FIGS. 1-3) so that the robot can turn the appendage toward that point. As yet another example, a user may specify a desired pitch and/or yaw of the appendage, and robot control system 560 can then translate that specified pitch and/or yaw into one or more positions of the rods (e.g. 110, 112 of FIGS. 1-3) and linear actuators (e.g. 106, 108 of FIGS. 1-3) so that the appendage can move to the specified orientation. Although reference is made to FIGS. 1-3, where present, a third linear actuator (e.g. 442 of FIG. 4) and third moveable rod (e.g. 438 of FIG. 4) can also be controlled similarly.

Although control system 560 is illustrated in FIG. 5 as an integral part of the robot 520, in some implementations, all or aspects of the control system 560 can be implemented in a component that is separate from, but in communication with, robot 520. For example, all or aspects of control system 560 can be implemented on one or more computing devices that are in wired and/or wireless communication with the robot 520, such as computing device 610.

Figure 6:
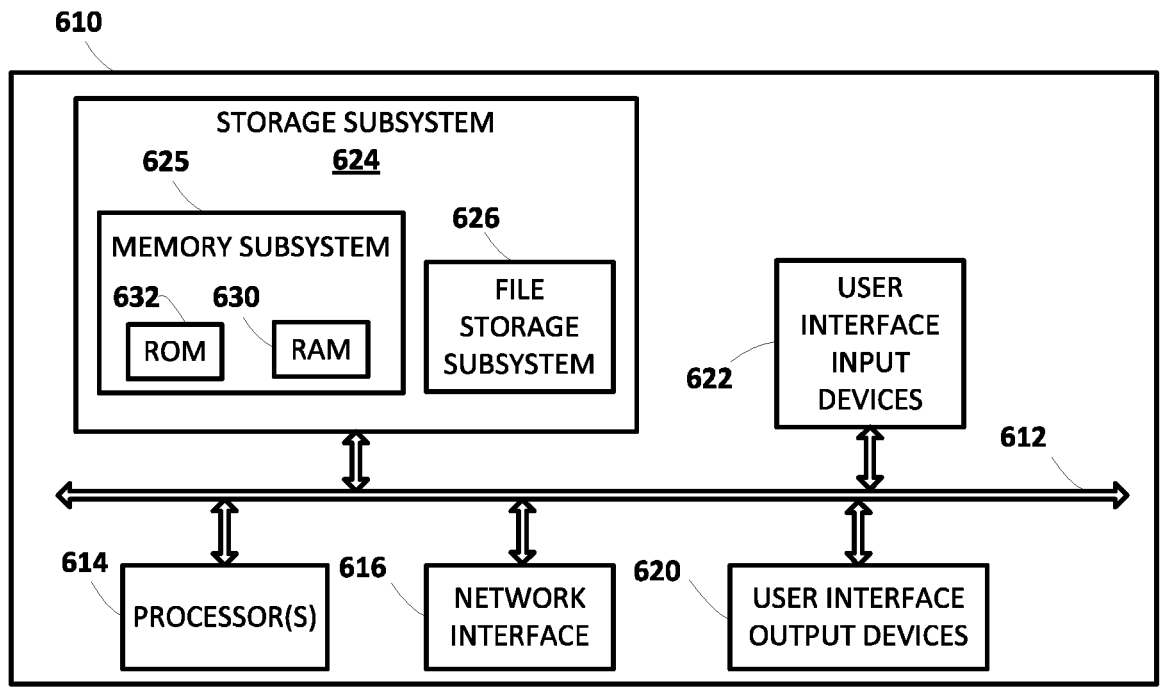
FIG. 6 schematically depicts an example architecture of a computer system.

FIG. 6 is a block diagram of an example computing device 610 that can optionally be utilized to perform one or more aspects of techniques described herein. Computing device 610 typically includes at least one processor 614 which communicates with a number of peripheral devices via bus subsystem 612. These peripheral devices can include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 can include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide non-visual display such as via audio output devices. In general, use of the term "output device" is intended to include all possible types of devices and ways to output information from computing device 610 to the user or to another machine or computing device. Storage subsystem 624 stores programming and data constructs that provide the functionality of some or all of the modules described herein. For example, the storage subsystem 624 may include the logic to perform selected aspects of the method of FIG. 7.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem can use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

Figure 7:
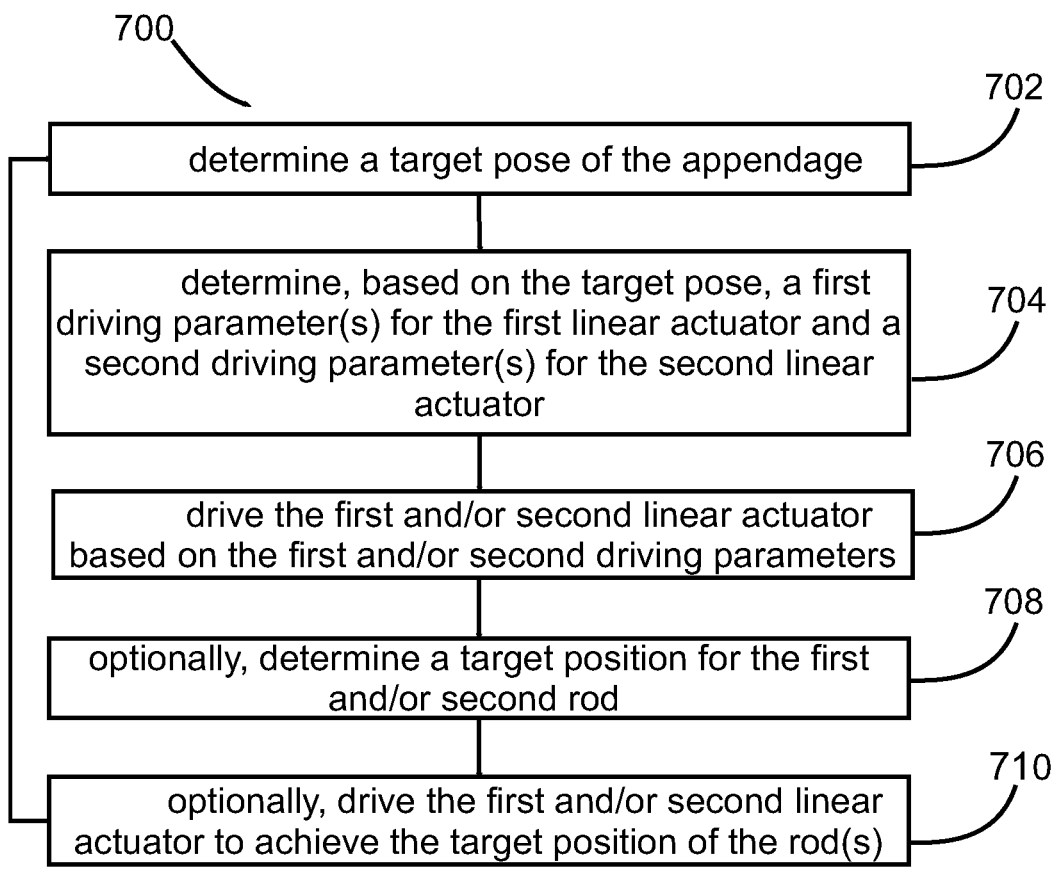
FIG. 7 depicts an example method for performing techniques described herein, in accordance with various implementations.

Referring now to FIG. 7, an example method 700 of moving an appendage of a robot is illustrated. The method 700 can be performed by processor(s) of a robot in various implementations, such as processor(s) implementing robot control system 560 of robot 520 (FIG. 5). While operations of method 700 are shown in a particular order, this is not meant to be limiting. One or more operations may be reordered, omitted or added.

At block 702, a target pose of an appendage of the robot can be determined. In some implementations, the target pose can be determined based on user input. For example, as described previously herein, a user may specify a point in three-dimensional space that would represent the target pose. As another example, a user may specify a desired pitch and/or yaw of the appendage, which would also represent a target pose of the appendage. In still other implementations, the target pose can be determined based on signals the robot control system receives from one or more sensors, vison components, or the like of the robot. For example, the target pose can be determined by a robot control system based on environmental characteristic(s), as determined based on sensor data, and/or based on a task to be performed by the robot. For instance, a task to be performed can include "nodding" the appendage and the target pose can be one, of a sequence of poses, determined to cause the appendage to nod.

At block 704, based on the target posed determined at block 702, one or more driving parameters for a first and/or second linear actuator (e.g. 106, 108 of FIGS. 1-3) are determined. Control of the linear actuators can effectuate movement of the rods to achieve this certain position, as such these driving parameters can, in some implementation, include information regarding a corresponding target position of each linear actuator and/or a corresponding length of the stroke of each linear actuator required to achieve the target pose of the appendage. For example, one or more of the rods can be moved as described herein to actuate tilt, pitch, and/or yaw to achieve this certain position. Furthermore, in implementations where this certain position is a sequence of poses (e.g. "nodding" or "shaking of the appendage) the rate of change, in addition to the positioning, of in the rods as they move can also be included in the driving parameters. At block 706, the first and/or second linear actuator is driven based on the driving parameters so as to achieve the specified target pose.

Optionally, at block 708, a target position for the first and/or second rod are determined as a part of the driving parameters determined at block 704. The target position of the rod(s) can also, in some implementations, include information regarding the positioning of the lever(s), where present. In other implementations, the target position of the rod(s) can also include information regarding a rate of change between the rod(s).

At block 710, the first and/or second linear actuator is driven to achieve the target position of the rod(s).

In some implementations, the method 700 can additionally include returning to block 702 to determine a second target pose based on a signal from one or more vison components or sensors on the appendage. This second (or third and so on) target pose can allow for continued actuation of the appendage. This second target pose can, in various implementations, be a response to a stimulus. As a non-limiting example, an audio sensor on the appendage send a signal of a particular sound to the robot control system, which then determines a second target pose for the appendage in response to this signal. This second target pose can be that the appendage is turned toward the origination of the sound. In another non-limiting example, the second target pose can be a series of movements effectuated by the appendage; for example, the target pose of an appendage in the form of a head can be the robot shaking its head vertically to indicate "yes" or affirmative or horizontally to indicate "no" of negative in response to a stimulus.

In some implementation, a robot component is provided that includes: a neck with a first linear actuator coupled to a first end of a first rod, where the first linear actuator linearly drives the first rod, and a second linear actuator coupled to a first end of a second rod, where the second linear actuator linearly drives the second rod; an appendage coupled to the neck, the appendage including a first track that receives a second end of the first rod to slidably engage the first rod and a second track that receives a second end of the second rod to slidably engage the second rod.

These and other implementations of the technology disclosed herein can include one or more of the following features.

In some implementations, the neck further includes a third linear actuator coupled to a first end of a third rod, and where the appendage further includes a third track that receives a second end of the third rod to slidably engage the third rod. In other implementations, the neck further includes a fixed rod with a first end and a second end, where the first end of the fixed rod is anchored to the neck and the second end coupled to the appendage.

In some implementations, the appendage is coupled to the neck by a spring; the spring including a spring first end coupled to the appendage and a spring second end coupled to the neck. In some such implementations, the appendage is removable by uncoupling the spring from the neck or appendage.

In some implementations, the appendage further includes an electrical connection sized and positioned to couple with a corresponding electrical connection on a robot.

In some implementation, the appendage further includes one or more cameras or sensors that at least selectively transmit a signal to a controller of the robot.

In some implementations, the first and second rods move linearly to actuate the appendage; an angle of contact between one of the at least two tracks and the second end of the first or second rod varies based on a position of the appendage.

In some implementations, the first linear actuator is coupled to the first end of the first rod by a lever. In some such implementations, the first linear actuator is further coupled to the first end of the first rod by a flexure that connects the lever to the first end of the first rod. In other such implementations, the extension of the first and second rods is actuated by the lever.

In some implementations, a robot neck is provided that includes: a first linear actuator coupled to a first end of a first rod; a second linear actuator coupled to a first end of a second rod; where a second end of the first rod and second end of the second rod are sized and positioned to contact a first and second track of an appendage to slidably engage the first and second rods with respective ones of the first and second track; and one or more structures sized and positioned to removably engage a linkage to couple an appendage with the neck.

These and other implementations of the technology disclosed herein can include one or more of the following features.

In some implementations the neck further includes a third linear actuator coupled to a first end of a third rod, where the third rod is sized and positioned to contact a third track of the appendage to slidably engage the third rod. In other implementations, the neck further includes a fixed rod with a first end and a second end, where the first end of the fixed rod is anchored to the neck and the second end is sized and positioned to couple to the appendage.

In some implementations, the first and second rods move linearly to actuate the appendage. In some such implementations, the first linear actuator is coupled to a first end of the first rod by a lever and the extension of the first rod is actuated by the lever. In various implementations, the first linear actuator is further coupled to a first end of the first rod by a flexure connecting the lever to the first end of the first rod.

In some implementation, a robot appendage is provided that includes: a first track sized and positioned to slidably engage a second end of a first rod coupled to a first linear actuator; a second track sized and positioned to slidably engage a second end of a second rod coupled to a second linear actuator; and a linkage removably coupled with the appendage.

These and other implementations of the technology disclosed herein can include one or more of the following features.

In some implementations, the appendage further includes an electrical connection sized and positioned to couple with a corresponding electrical connection on the robot.

In some other implementations, the appendage further includes one or more cameras or sensors sized and positioned to transmit a signal to a controller of the robot.

In some implementation, a robot is provided that includes: a body; a neck having a first linear actuator coupled to a first end of a first rod, where the first linear actuator linearly drives the first rod and a second linear actuator coupled to a first end of a second rod, where the second linear actuator linearly drives the second rod; an appendage having a first track that receives a second end of the first rod to slidably engage the first rod; a second track that receives a second end of the second rod to slidably engage the second rod; where the appendage is coupled to the neck; one or more processors, where the one or more processors execute instructions to: determine a target pose of the appendage; and translate the target pose into a first target position of the first rod and a second target position of the second rod; and provide control commands to drive the first and second linear actuators to achieve the first target position and the second target position.

In some implementations, the robot further includes one or more cameras or sensors that transmit a signal to the robot control system, and where the robot control system determines a target pose of the appendage based on the signal received from the one or more cameras or sensors.

In some implementations, a method of moving an appendage of a robot is provided that includes: driving a first linear actuator of a neck of the robot to cause linear movement of a first rod, where the first rod is engaged by a first track disposed on the appendage; and driving a second linear actuator of the neck of the robot to cause linear movement of a second rod, where the second rod is engaged by a second track disposed on the appendage; where the linear movement of the first rod and the linear movement of the second rod causes an end of the first rod to slide within the first track and an end of the second rods to slide within the second track.

In some implementations, the neck further includes a third linear actuator and the appendage further includes a third track, the method further includes driving, by the third linear actuator, linear movement of the third rod, where the third rod is engaged by a third track disposed on the appendage.

In some implementations, the neck further includes a fixed rod with a first end and a second end, and the method further includes: anchoring the first end of the fixed rod to the neck; and coupling the second end of the fixed rod to the appendage. In some such implementations, the method further includes uncoupling the neck from the appendage.

In some implementations the method further includes: determining a target pose of the appendage; and determining, based on the target pose, one or more first driving parameters for the first linear actuator and one or more second driving parameters for the second linear actuator; where driving the first linear actuator is based on the first driving parameters, and where driving the second linear actuator is based on the second driving parameters. In some such implementations, the one or more first driving parameters include a first target position of the first rod and where the one or more second driving parameters include a second target position of the second rod; where driving the first linear actuator based on the first driving parameters comprises driving the first linear actuator to the first target position; and where driving the second linear actuator based on the second driving parameters comprises driving the second linear actuator to the second target position. In other various implementations, the appendage further includes one or more cameras or sensors sized and positioned to transmit a signal to the robot control system, the method further comprising determining a second target pose based on the signal.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A robot component comprising:
a neck comprising:
a first linear actuator coupled to a first end of a first rod, wherein the first linear actuator linearly drives the first rod;
a second linear actuator coupled to a first end of a second rod, wherein the second linear actuator linearly drives the second rod;
an appendage coupled to the neck, the appendage comprising:
a first linear channel that receives a second end of the first rod to slidably engage the first rod; and
a second linear channel that receives a second end of the second rod to slidably engage the second rod.

2. The robot component of claim 1, wherein the neck further comprises a third linear actuator coupled to a first end of a third rod, and wherein the appendage further comprises a third channel that receives a second end of the third rod to slidably engage the third rod.

3. The robot component of claim 1, wherein the neck further comprises a fixed rod with a first end and a second end, wherein the first end of the fixed rod is anchored to the neck and the second end of the fixed rod coupled to the appendage.

4. The robot component of claim 1, wherein the appendage is coupled to the neck by a spring including a spring first end coupled to the appendage and a spring second end coupled to the neck.

5. The robot component of claim 4, wherein the appendage is removable by uncoupling the spring from the neck or the appendage.

6. The robot component of claim 1, wherein the appendage further comprises an electrical connection sized and positioned to couple with a corresponding electrical connection on a robot.

7. The robot component of claim 6, wherein the appendage further includes one or more cameras or sensors that at least selectively transmit a signal to a controller of the robot.

8. The robot component of claim 1, wherein the first and second rods move linearly to actuate the appendage, and wherein an angle of contact between one of the first linear channel and the second linear channel and the second end of the first or the second rods varies based on a position of the appendage.

9. The robot component of claim 1, wherein the first linear actuator is coupled to the first end of the first rod by a lever.

10. The robot component of claim 9, wherein the first linear actuator is further coupled to the first end of the first rod by a flexure that connects the lever to the first end of the first rod.

11. The robot component of claim 9, wherein an extension or a retraction of the first rod is actuated by the lever.

12. A robot neck comprising:
a first linear actuator coupled to a first end of a first rod;
a second linear actuator coupled to a first end of a second rod;
wherein a second end of the first rod and a second end of the second rod are sized and positioned to contact a first and second linear channels of an appendage to slidably engage the first and second rods with respective ones of the first and second linear channels; and
one or more structures sized and positioned to removably engage a linkage to couple the appendage with a neck.

13. The robot neck of claim 12, wherein the neck further comprises a third linear actuator coupled to a first end of a third rod, and wherein the third rod is sized and positioned to contact a third channel of the appendage to slidably engage the third rod.

14. The robot neck of claim 12, wherein the neck further comprises a fixed rod with a first end and a second end, wherein the first end of the fixed rod is anchored to the neck and the second end of the fixed rod is sized and positioned to couple to the appendage.

15. The robot neck of claim 12, wherein the first and second rods move linearly to actuate the appendage.

16. The robot neck of claim 15, wherein the first linear actuator is coupled to the first end of the first rod by a lever and an extension or a retraction of the first rod is actuated by the lever.

17. The robot neck of claim 16, wherein the first linear actuator is further coupled to the first end of the first rod by a flexure connecting the lever to the first end of the first rod.

18. A robot appendage comprising:
a first linear channel sized and positioned to slidably engage a second end of a first rod coupled to a first linear actuator;
a second linear channel sized and positioned to slidably engage a second end of a second rod coupled to a second linear actuator; and
a linkage removably coupled with the robot appendage.

19. The robot appendage of claim 18, wherein the appendage further comprises an electrical connection sized and positioned to couple with a corresponding electrical connection on the robot appendage.

20. The robot appendage of claim 18, wherein the appendage further includes one or more cameras or sensors sized and positioned to transmit a signal to a controller of the robot appendage.

* * * * *